(12) United States Patent
Li et al.

(10) Patent No.: US 7,765,216 B2
(45) Date of Patent: Jul. 27, 2010

(54) MULTIDIMENSIONAL ANALYSIS TOOL FOR HIGH DIMENSIONAL DATA

(75) Inventors: Yantao Li, Beijing (CN); Guowei Liu, Beijing (CN); Haidong Zhang, Beijing (CN); Adnan Azfar Mahmud, Kirkland, WA (US); Bing Sun, Beijing (CN); Min Wang, Beijing (CN); Wenli Zhu, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 392 days.

(21) Appl. No.: 11/818,607

(22) Filed: Jun. 15, 2007

(65) Prior Publication Data

US 2008/0313184 A1 Dec. 18, 2008

(51) Int. Cl.
*G06F 17/30* (2006.01)

(52) U.S. Cl. .................. 707/742; 707/705; 707/748; 707/752

(58) Field of Classification Search .............. 707/3, 707/5, 100, 705, 736, 741, 742; 709/203; 715/209; 714/38; 717/127
See application file for complete search history.

(56) References Cited

U.S. PATENT DOCUMENTS

| | | | | |
|---|---|---|---|---|
| 4,068,298 | A | * | 1/1978 | Dechant et al. ............. 707/770 |
| 5,619,709 | A | * | 4/1997 | Caid et al. .................. 715/209 |
| 6,131,082 | A | | 10/2000 | Hargrave, III et al. |
| 6,154,746 | A | | 11/2000 | Berchtold et al. |
| 6,260,050 | B1 | | 7/2001 | Yost et al. |
| 6,317,750 | B1 | | 11/2001 | Tortolani et al. |
| 6,385,604 | B1 | * | 5/2002 | Bakalash et al. ............. 707/3 |
| 6,418,427 | B1 | | 7/2002 | Egilsson et al. |
| 6,434,544 | B1 | | 8/2002 | Bakalash et al. |
| 6,567,796 | B1 | | 5/2003 | Yost et al. |
| 6,601,062 | B1 | | 7/2003 | Deshpande et al. |
| 6,714,940 | B2 | | 3/2004 | Kelkar |
| 6,768,986 | B2 | | 7/2004 | Cras et al. |
| 7,062,483 | B2 | | 6/2006 | Ferrari et al. |
| 7,080,091 | B2 | * | 7/2006 | Matsuda ................... 707/803 |
| 7,117,208 | B2 | | 10/2006 | Tamayo et al. |
| 7,171,406 | B2 | | 1/2007 | Chen et al. |
| 7,315,849 | B2 | | 1/2008 | Bakalash et al. |
| 7,333,982 | B2 | | 2/2008 | Bakalash et al. |
| 7,392,248 | B2 | | 6/2008 | Bakalash et al. |

(Continued)

FOREIGN PATENT DOCUMENTS

KR  1020030022663 A  3/2004

OTHER PUBLICATIONS

Han Jiawei, et al., "Stream Cube: An Architecture for Multi-Dimensional Analysis of Data Streams", Springer Science + Business Media, Inc., Date: 2005, pp. 173-197.

(Continued)

*Primary Examiner*—Shahid A Alam

(57) ABSTRACT

Described is a technology by which high dimensional data may be efficiently analyzed, including by filtering, grouping, aggregating and/or sorting operations to provide an analysis result. For efficiency in the analysis, an inverted index may be built (e.g., as part of filtering), and/or a hash structure (e.g., as part of grouping). Analysis parameters specify dimensions, on which union and/or intersection operations are performed to provide a final dataset. The analysis tool provides a user interface for inputting analysis parameters and outputting information corresponding to an analysis result. The analysis tool may sort the information corresponding to the analysis result, e.g., to output the topmost or bottommost results.

17 Claims, 10 Drawing Sheets

U.S. PATENT DOCUMENTS

| | | | |
|---|---|---|---|
| 7,627,564 | B2 * | 12/2009 | Yao et al. .................... 707/713 |
| 2003/0115207 | A1 | 6/2003 | Bowman et al. |
| 2004/0049505 | A1 | 3/2004 | Pennock |
| 2004/0122646 | A1 | 6/2004 | Colossi et al. |
| 2004/0193576 | A1 | 9/2004 | Petculescu |
| 2005/0065910 | A1 | 3/2005 | Welton et al. |
| 2005/0065940 | A1 | 3/2005 | Bakalash |
| 2005/0131924 | A1 | 6/2005 | Hjones |
| 2005/0278290 | A1 | 12/2005 | Bruce et al. |
| 2005/0278378 | A1 * | 12/2005 | Frank ....................... 707/804 |
| 2006/0106793 | A1 | 5/2006 | Liang |
| 2006/0218138 | A1 | 9/2006 | Weare |
| 2006/0287993 | A1 * | 12/2006 | Yao et al. .................... 707/713 |
| 2008/0313213 | A1 | 12/2008 | Zhang et al. |

OTHER PUBLICATIONS

Li, Xiaolei et al., "High-Dimensional OLAP: A Minimal Cubing Approach", Proceedings of the 30th VLDB Conference, Date: 2004, pp. 528-539.

Orlandic et al., "Inverted-Space Storage Organization for Persistent Data of Very High Dimensionality", 2001, International Conference on Information Technology: Coding and Computing (ITCC '01), 6 pages.

Shah, Biren, "On Improving Information Retrieval Performance from Structured, Semistructured and Un-structured Information Sources", Fall 2005, Disertation, University of Louisiana at Lafayette, 198 pages.

Kratky, Michal, "Multi-dimensional Approach to Indexing XML Data", 2004, Ph.D Thesis, Department of Computer Science, Technical University of Ostrava, Czech Republic, 127 pages.

PCT International Search Report and Opinion - from PCT/US2008/067054, dated Oct. 31, 2008.

* cited by examiner

| Session ID | Mem size | CPU | App | Exit type | User ID | ... |
|---|---|---|---|---|---|---|
| 0 | 223M | 1GHz | Word | Normal | 0 | ... |
| 1 | 511M | 2GHz | Word | Crash | 3 | ... |
| 2 | 512M | 733MHz | Word | Normal | 1 | ... |
| 3 | 768M | 1GHz | Excel | Normal | 0 | ... |
| 4 | 1024M | 1.5G Hz | Outlook | Crash | 2 | ... |
| 5 | 128M | 366MHz | Word | Normal | 2 | ... |
| 6 | 512M | 733MHz | Excel | Normal | 3 | ... |
| 7 | 192M | 366MHz | Excel | Normal | 5 | ... |
| 8 | 1024M | 2GHz | Outlook | Normal | 7 | ... |
| 9 | 512M | 1GHz | Word | Hang | 7 | ... |
| ... | ... | ... | ... | ... | ... | ... |

MULTIDIMENSIONAL ANALYSIS TOOL FOR HIGH DIMENSIONAL DATA

CROSS-REFERENCE TO RELATED APPLICATIONS

The present application is related to the following copending U.S. patent applications, assigned to the assignee of the present application, filed concurrently herewith and hereby incorporated by reference: Analyzing Software Users with Instrumentation Data and User Group Modeling and Analysis, U.S. patent application Ser. No. 11/818,610; Software Reliability Analysis Using Alerts, Asserts, and User Interface Controls, U.S. patent application Ser. No. 11/818,612; Efficient Data Infrastructure for High Dimensional Data Analysis, U.S. patent application Ser. No. 11/818,879; Software Feature Usage Analysis and Reporting, U.S. patent application Ser. No. 11/818,600; Software Feature Modeling and Recognition, U.S. patent application Ser. No. 11/818,596; and Analyzing Software Usage with Instrumentation Data, U.S. patent application Ser. No. 11/818,611.

BACKGROUND

To resolve many business-related questions, a tool referred to as multidimensional analysis is used, which in SQL terms is a 'group by' operation. Generally for one query, a large amount of data is involved, whereby computing performance is critical to obtain the results, e.g., users cannot wait several hours to get analysis results.

Current OLAP (Online Analytical Processing) systems enhance the performance by pre-computing data cubes that correspond to the multidimensional arrangement of the data to be analyzed. More particularly, in OLAP, a dimension is a category of data represented in one column of a table, and a measure represents data in the table that can be accessed by specifying values for its dimensions. A set of measures having the same dimensions may be represented as an OLAP cube.

However, as the number of dimensions increases, the storage required for data cubes grows exponentially. As a result of this limitation, one cube can only support tens of dimensions. There was heretofore no known effective tool that is able to support an analysis of high-dimensional data, such as data having thousands of dimensions, yet such data exists in a number of situations for which data analysis is desired.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which high dimensional data may be efficiently analyzed, including by filtering, grouping, aggregating and/or sorting operations. For efficiency in the analysis, an inverted index may be built (e.g., as part of filtering), and a hash structure (e.g., as part of grouping).

Analysis parameters are received that correspond to one or more sets of dimension values. For multiple dimensions, union and/or intersection operations are performed to assemble the requested data into a final dataset. An inverted index is built for each dimension which facilitates lookup of identifiers that are associated with data values in that dimension. A hash structure may be built to group together identifiers having identical dimension values.

In one implementation, the analysis is performed by an analysis tool that includes a user interface for inputting analysis parameters and outputting information corresponding to an analysis result. The analysis tool may sort the information corresponding to the analysis result, to output a subset of the information that is smaller than all of the available information, e.g., the topmost or bottommost results.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a mechanism/tool that support multidimensional analysis of high dimensional data, in which a computation model is developed and may be used in an online state. In one example implementation, an inverted index is used for fast data retrieval, and an efficient grouping algorithm is described based on hashing technology.

For purposes of description, various examples herein are directed towards software quality metrics (SQM) data, which is generally data that was recorded during usage sessions of software products and is very high dimensional, e.g., SQM data may have many thousands of dimensions. However, as will be understood, these are only non-limiting examples, as the technology generally applies to computation (e.g., online) for multidimensional analysis of high dimensional data, regardless of the data type, as well as inverted index and hashing for enhancing the performance of multidimensional analysis.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Figure 1:
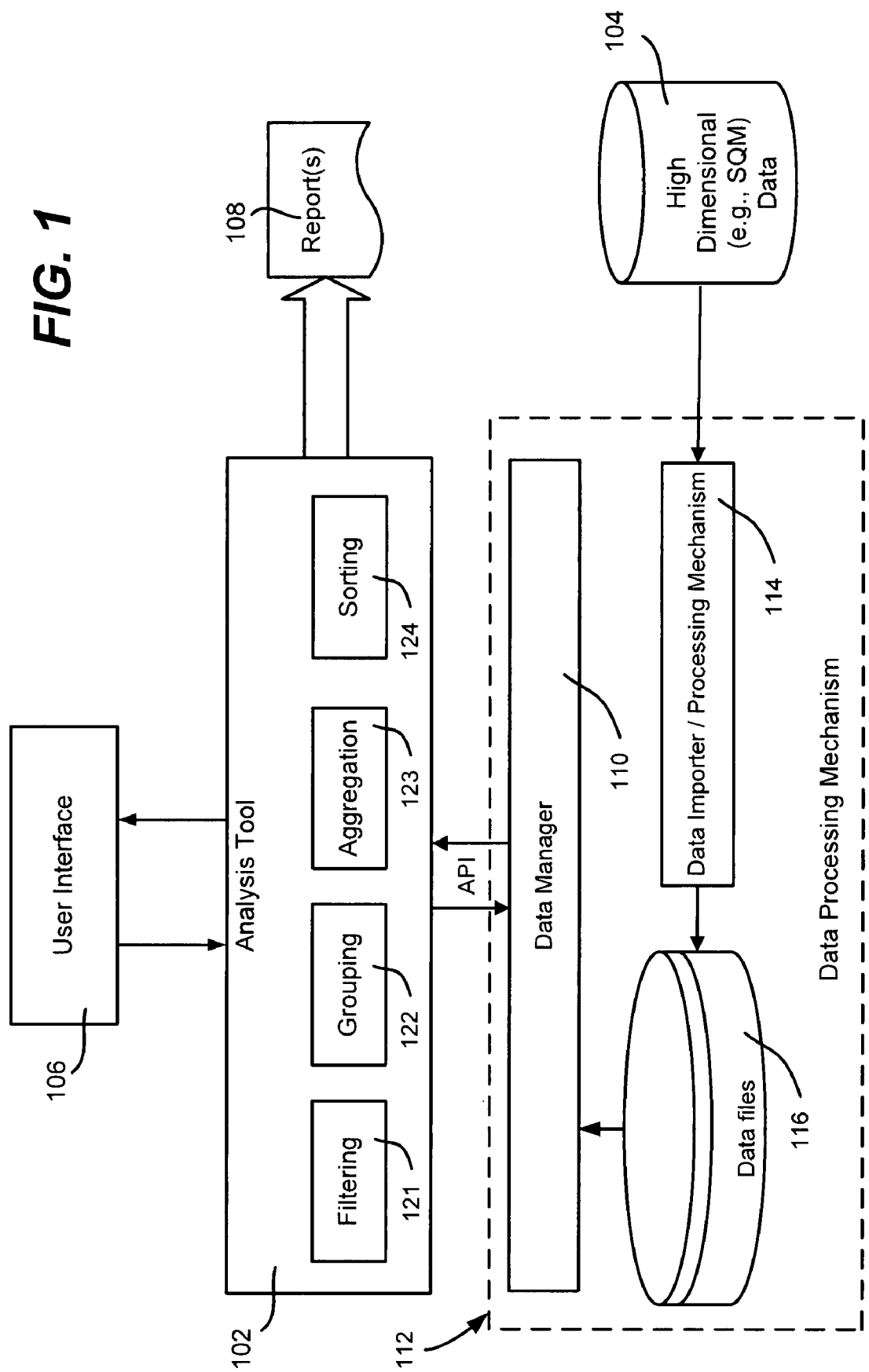
FIG. 1 shows an example representation of an analysis tool including components for generating analysis results (e.g., one or more reports) from high-dimensional data.

Turning to FIG. 1, there is shown an analysis tool 102 for analyzing information corresponding to high-dimensional data 104. In one example implementation, a user interface 106 comprises a client of the tool 102, which allows an operator (user) to define a query and send the query to the analysis tool (e.g., a service thereof). In return, the operator receives query results back, such as presented in a report set 108 comprising one or more reports.

In one example implementation generally represented in FIG. 1 and described in the aforementioned U.S. patent application entitled "Efficient Data Infrastructure for High Dimensional Data Analysis," access to the information is via a data manager 110 of a data processing mechanism 112. In general, a data importer/processor 114 converts the high dimensional data (e.g., SQM data) in the source 104 into a set of data files 116. To this end, when the original data is in some source such as a database, the data importer/processor component 114 pulls the data from the data source 104 and converts the data into data files 116 arranged for efficient data retrieval, as set forth below.

As can be readily appreciated, the data manager 110 may simply provide access to the data and/or data files, or alternatively can provide at least some functionality. For example, in one implementation, for a given dimension, the APIs provide functions to get the raw values of specified rows, functions to get the mapped values of specified rows, functions to get the rows of specified raw values, functions to get the rows of specified mapped values, functions to get a mapped value dictionary and functions to get the row count.

Other functionality such as filtering, grouping, sorting, aggregating and so forth may be provided by the data manager 110, but alternatively may be secondarily processed from the retrieved data. In the example implementation described herein and represented in FIG. 1, the analysis tool 102 provides mechanisms 121-124 for filtering, grouping, sorting and aggregating, respectively, as described below.

In one example, to define an analysis and get the results, the operator provides search dimensions and measures for searching, (where in general, dimensions and measures are similar to OLAP concepts thereof), such as by inputting keywords in a search text box. In general, a dimension may be any variable recorded in a session, a feature (e.g., copy and paste, typically comprising a series of commands), and/or variables that are not directly recorded in a session, but rather are calculated from other variables that are recorded. Matching results may be displayed in association with (e.g., under) the search text box.

Figure 2:
FIG. 2 shows a representation of example high-dimensional data in the form of a table of software instrumentation (e.g., software quality metrics, or SQM) data saved for various program usage sessions by users of a suite of application programs.

FIG. 2 provides an example of instrumentation data 206, with some of the collected data (arranged in columns) for some number of program usage sessions (arranged in rows). In general, the example instrumentation data 206 comprise data collected from each user session, where a session corresponds to actual usage by a user of an executing program. A session starts from the application start, and ends when the application is closed or otherwise terminated. Sessions can also be time limited, e.g., if a session exceeds twenty-four hours, the session is ended and the instrumentation data recorded (the application continues to run). In SQM, each record corresponds to one session, which is the period of a single run of a software program under evaluation, e.g., a software application program of the Microsoft® Office suite of software programs.

In one example implementation, each session is associated with some or all of the information shown in FIG. 2, including a session ID, a user ID, and an application name. Other information that is typically recorded includes the application version, a start time, an end time, the commands used during the session and still other data, such as the number of files opened and so forth.

Conceptually the data can be viewed as a (very large) table, in which each row represents a record and each column represents a dimension, where there could be thousands of dimensions. In the example below, the data recorded in a session include memory size, CPU speed, application name, and so forth. In one system, the data is organized by column, with inverted indices built for high retrieval.

Figure 3:
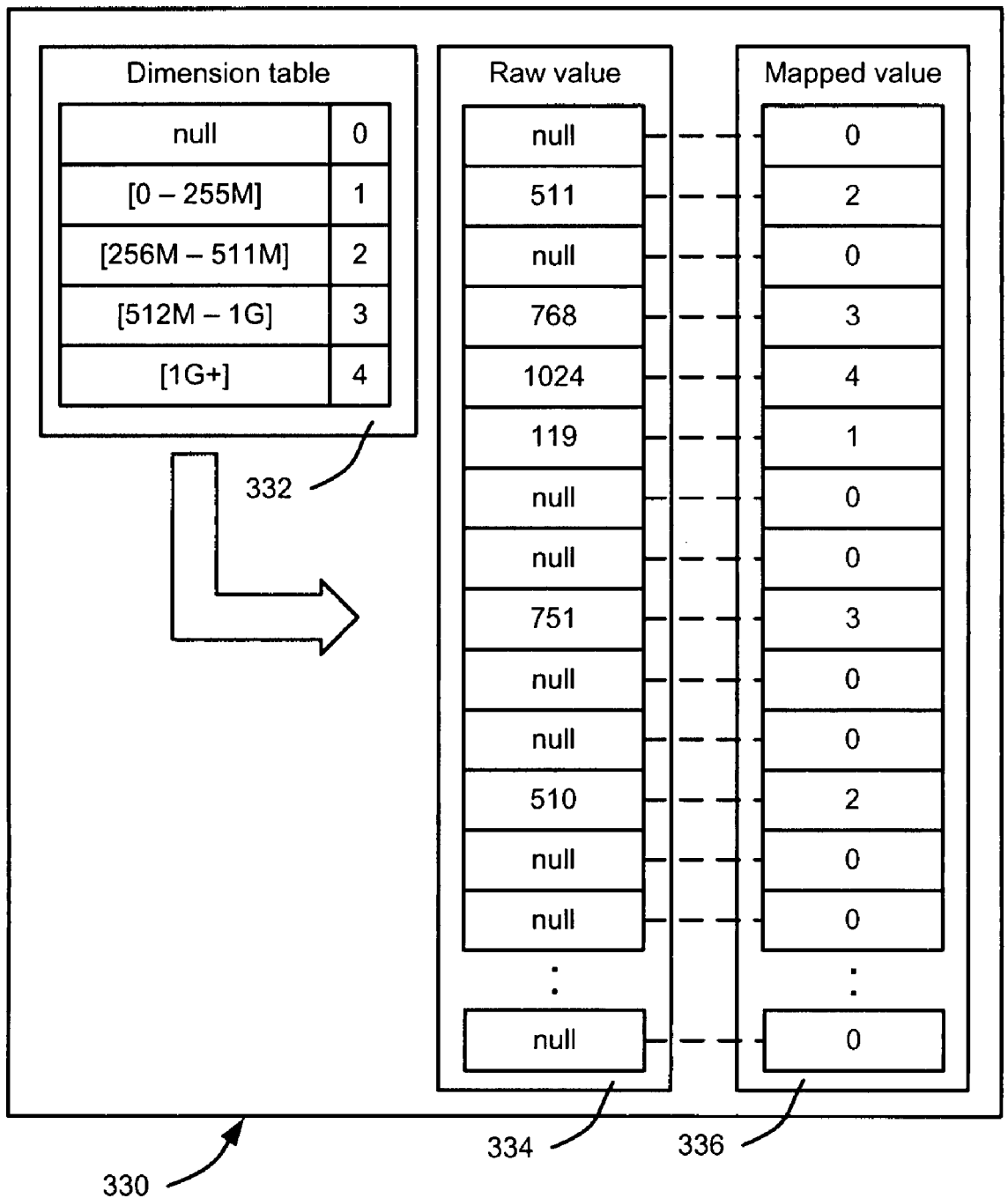
FIG. 3 shows an example representation of using a dimension table to map raw values to mapped values.

A first part of the data organization processing is represented in the block 330 of FIG. 3. In general, in block 330 the data is organized by columns, and each column corresponds to three data structures, which in this example comprise files, namely a dimension table file 332, the raw data file 334 and a mapped data file 336. The raw data file 334 is used to store the values of a column (in each row) of the source data 106, and the mapped data file 336 is used to store the mapped value for each raw value. The mapping is defined in the dimension table file 332.

In the example of FIG. 3, the dimension table 332 defines a memory size range for each mapped value. For any suitable dimension, an operator of the analysis process or the like may determine the ranges as appropriate for the desired analysis. Using the range, each raw value is mapped to a corresponding mapped value. Nulls are mapped to zero (although in a real world model, each session would ordinarily have some memory and thus few if any nulls would be present, unless not reported for some reason). Thus, using the range of 256 MB to 511 MB, it is seen in FIG. 3 that the raw value of 511 (MB) is mapped to a value of two (2), the raw value of 768 (MB) is mapped to a value of three (3) based on the range in the dimension table 312 of 512 MB to 1 GB, and so forth.

Figure 4:
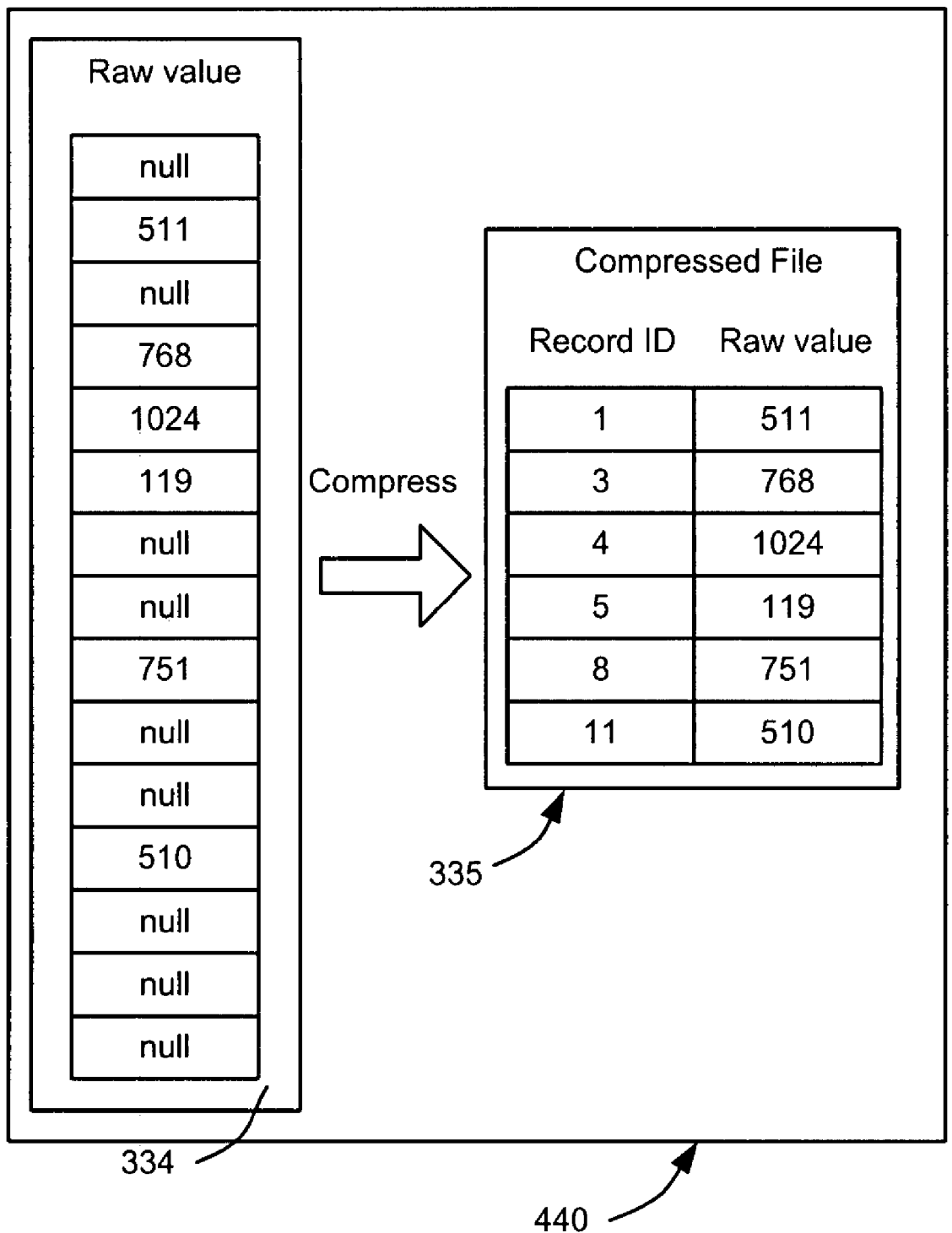
FIG. 4 shows an example representation of mapping raw values into a compressed file.

In the raw data file 334, values can be stored sequentially as vectors. However, some dimensions are relatively sparse because there are often 'null' values in the data. For such dimensions, compression techniques may be used to store the data so that the amount of required data storage can be reduced. One example is represented in the block 440 of FIG. 4, in which a compressed file 335 is built from the raw value file 334. As can be seen in the compressed file 335, only the non-null values are recorded by storing them in association with a record identifier, e.g., as RecordID, value pairs. The compressed file 335 may be used instead of the raw value file 334 when mapping; any RecordID values skipped in the compressed data file 335 are known to have a null raw value.

For high retrieval performance, inverted indices are built from the data. In general, using SQM data as an example, an inverted index uses a data value (a dimension or measure) as an index to a set of one or more sessions in which that data appeared. For example, if the data value corresponded to the Excel spreadsheet program, the inverted index would find that the Excel spreadsheet program was associated with sessions 125, 230, 1415, 6153, and so forth.

In one implementation, for each column of data, an inverted index is built and stored into two files; one file stores the row identifiers for each mapped value, and another file stores the row count and offset in the first file for each mapped value. With the inverted index, the retrieval of records for a given mapped value is efficient, requiring only a constant time. Note that in general, any performance enhancement cannot rely on pre-computation because there are too many potential results to be pre-computed. As such, a computation model is provided that may operate in an online fashion.

Figure 5:
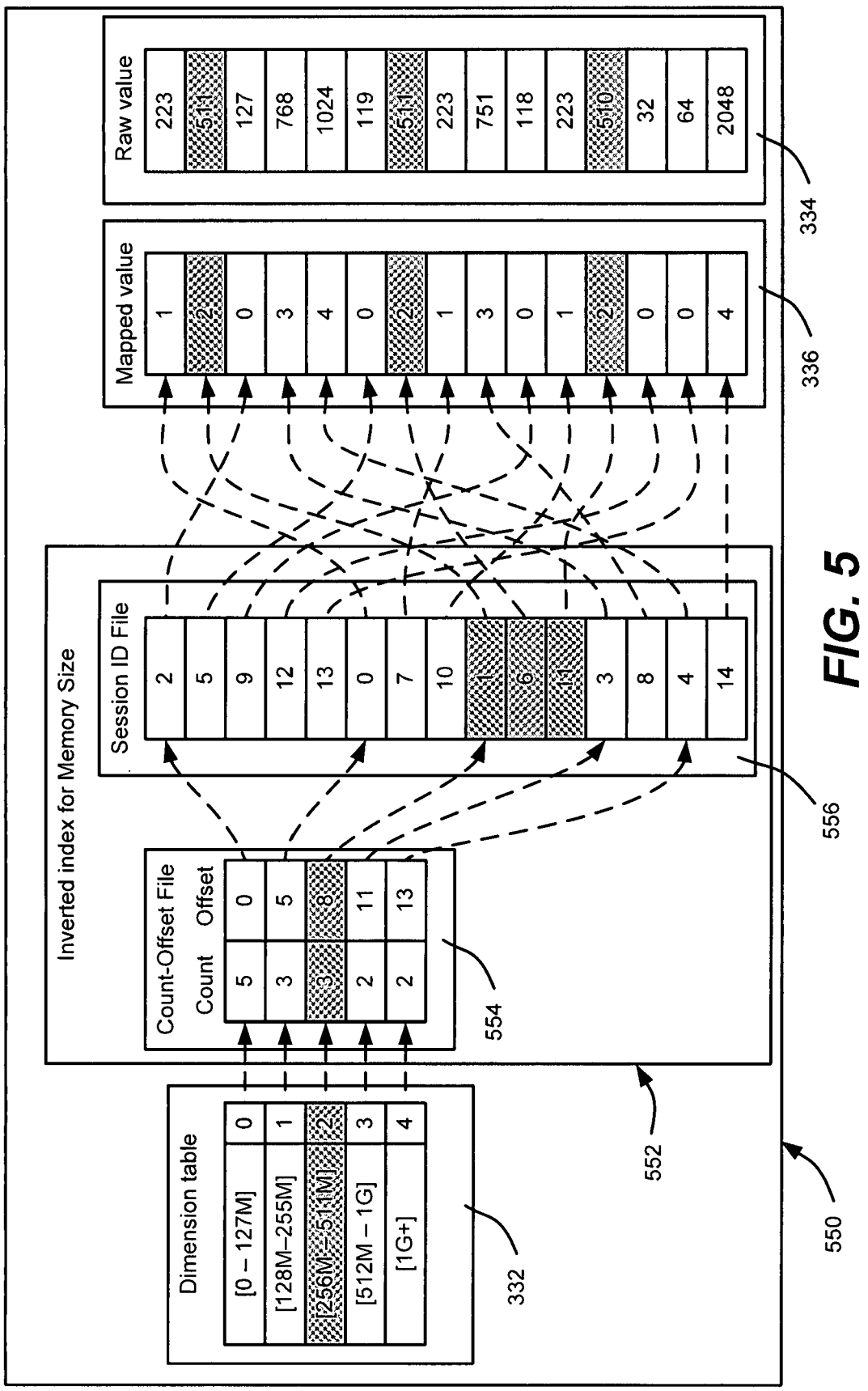
FIG. 5 shows an example representation of building an inverted index for a memory size variable recorded in a dimension.

Block 550 of FIG. 5 shows an example inverted index 552 comprising inverted index files 554 and 556 for the variable that represents the memory size ("MemSize") in the logged session SQM data. The shaded blocks show how the session ID that is set with the memory size range from 256M to 511M (mapped value 2 via the dimension table 332) is retrieved with the inverted index 552 built for the MemSize variable. As can be seen, for the range from 256M to 511M, there is a count of three (3) session ID entries, beginning at offset eight (8), namely session IDs one (1), six (6) and eleven (11). These correspond to the three mapped values of two (2) in the mapped value file 334, which map to raw values 511, 511 and 510 in the raw value file 336. Note again that the compressed file 335 of FIG. 4 may be provided instead of the raw value file 334 wherever appropriate.

Block 660 shows an example inverted index 662 comprising inverted index files 664 and 666 for the variable that represents an application program of the Microsoft® Office software product suite in the logged session SQM data. The shaded blocks show how a session ID for the Word sessions and Outlook sessions (mapped values 0 and 2 respectively via the dimension table 668) is retrieved with the inverted index 662.

Turning to analysis operation, an operator can define filters in the client user interface 106 to determine a target session set. For example, in the client user interface, the user can drag a dimension from the dimension list into the filter panel, and choose members of interest. In general, the operator can specify any combination of dimensions and measures in an analysis. For example, in the client user interface, user can drag any dimension/measure into the dimension/measure panel, and specify a variable that is used for sorting.

The user interface 106 allows an operator or the like to set analysis parameters. After defining an analysis, user can run that analysis. The analysis service receives the queries, computes the analysis and sends the results back to the client. Steps for computation may include filtering, grouping, aggregating and sorting.

The query results are output in some way, such as presented in the user interface 106. For example, once a search is performed on a dimension or measure, the operator can select information for an item, (e.g., by clicking information button on the left of the dimension or measure item), and preview the information of the dimension or the measure. A preview window or the like may be used to display the owner and description of the dimension or the measure. For the dimension, there also may be information related to distribution.

As mentioned above, the operator may only be interested in some subset of the total sessions. To this end, a filtering mechanism (block 121 of FIG. 1) is used to determine a target session set. More particularly, using the inverted indices, the session filtering process is performed efficiently, e.g., because the session set for one dimension's value set can be retrieved efficiently. For multiple dimension values, union and intersection operations are performed on those session sets to get a final target session set.

Figure 6:
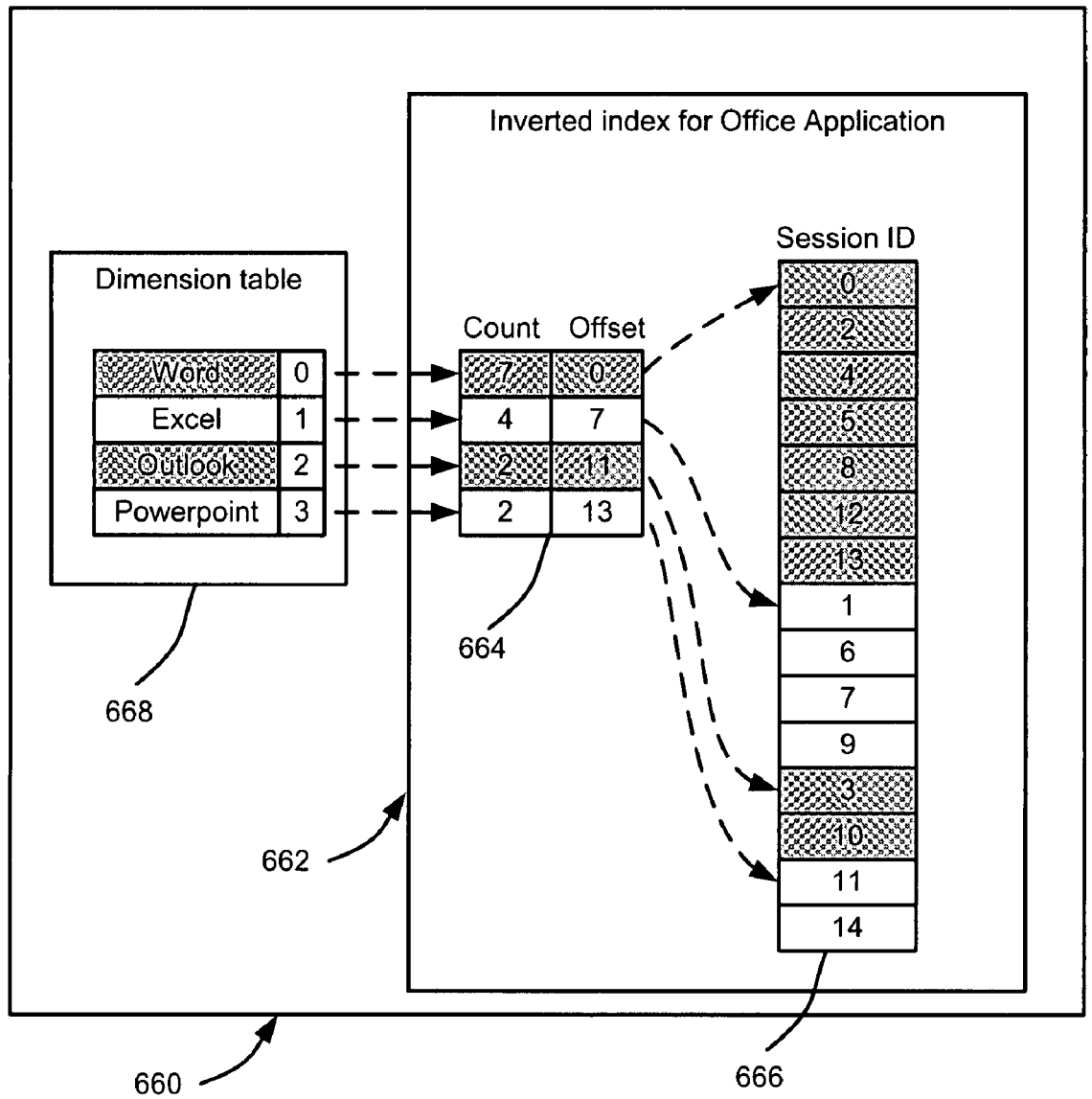
FIG. 6 shows an example representation of an inverted index for an application program variable recorded in a dimension.
Figure 7:
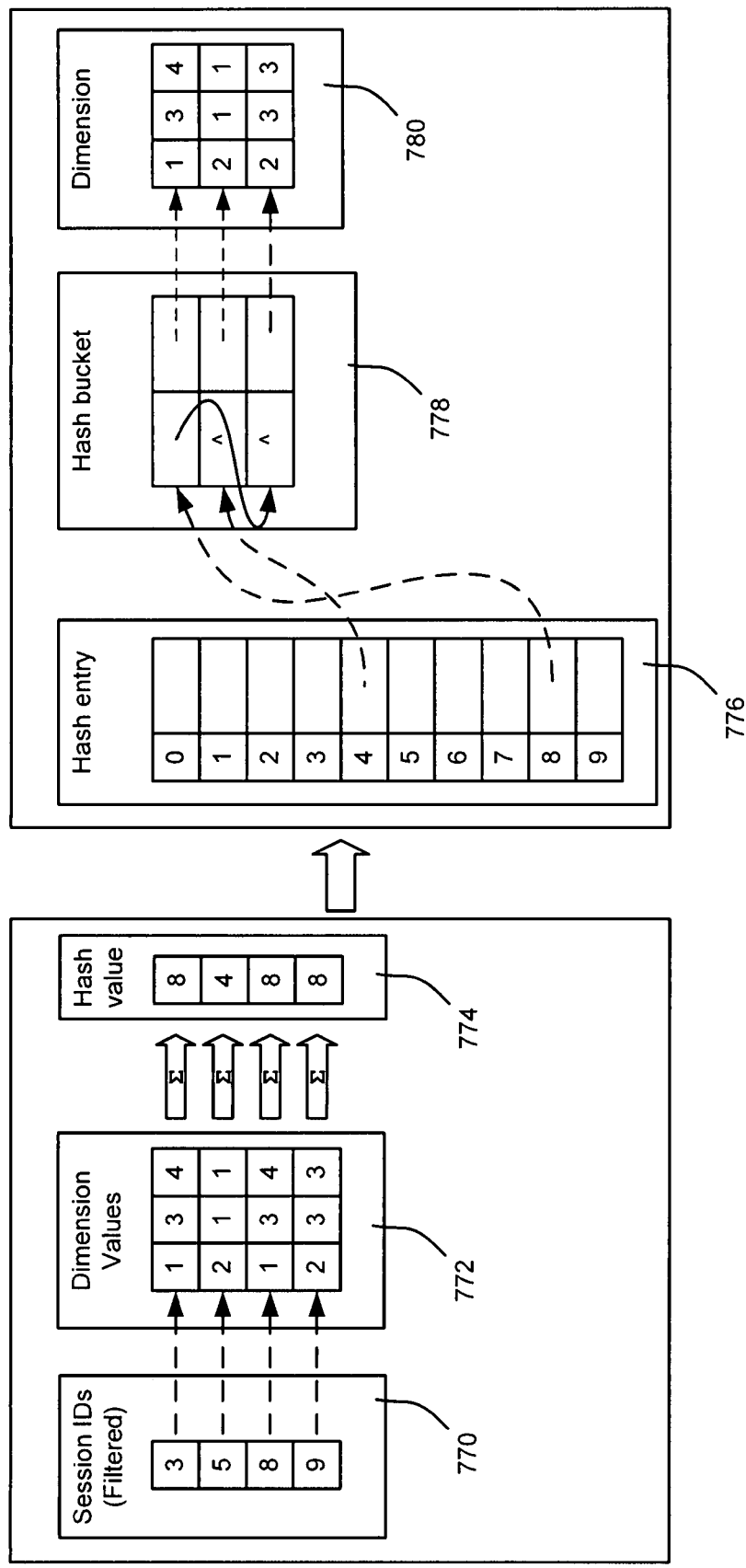
FIG. 7 shows an example representation of using a hash structure for a grouping operation.

For example, consider an operator that wants to select from the SQM data Microsoft® Word and Outlook sessions in which the computer memory size was the range from 128 MB to 255 MB. As can be seen in FIG. 7, the related variables are memory size (MemSize) and Office application (OfficeApplication). Using the inverted index 552 (FIG. 5) for memory size, the tool obtains a session list (e.g., ordered by session) containing sessions with memory size from 128 MB to 255 MB. With the inverted index 662 (FIG. 6) for OfficeApplication, the system gets two sorted session lists related to Word and Outlook sessions, respectively; these two session lists are merged with a union operation into a second, merged session list. An intersection operation is performed on the first and second, merged session lists to obtain the sessions that the user wants.

After the filtering process, the filtered sessions may be grouped by their dimension values, as represented in FIG. 1 via the grouping mechanism 122. Then for each session group, the measure values are calculated. As described below and represented in FIG. 7, in order to perform the session grouping efficiently, a hash structure is built in memory. The sessions with same dimension values are mapped to the same group.

For example, for each filtered session in the set 770, a hash value is calculated according to its dimension values (shown in the block 772). In this example, the hash values (shown in the block 774) are computed by adding up the dimension values, e.g., the session ID of three has dimension values of one, three and four, whereby the hash value is eight.

The hash entry structure 776 then has an entry added thereto for each sum, via the hash bucket 778. If the corresponding dimension group (block 780) already exists, the same group is used, e.g., session ID three (3) and session ID eight (8) both have dimension values of (1, 3, 4) and thus the same group is reused. If the corresponding dimension group does not already exist, a new group is inserted into the hash structure, as shown in FIG. 7. Note that the hash function handles collisions, e.g., session ID nine (9) has dimension values of (2, 3, 3) which also sums to eight (8), but has a different dimension group in block 780.

Various hash functions can be used in the grouping process. In one example system, the following efficient hash function is provided:

```
unsigned long Hash(dimension mapped values)
{
    h = 1;
    for i = 1 to dimension count do
    {
        h = .99487 * h + the mapped value the ith dimension;
    }
    return h;
}
```

Aggregation may be performed via an aggregating mechanism (block 123 of FIG. 1), in which the measures are computed for each session group. In one example, there are three kinds of measures, namely distributive measures, algebraic measures and holistic measures. Distributive measures, such as count and sum, are the measures that can be computed in a distributive manner. Algebraic measures are the measures that can be computed from two or more distributive measures. For example, Crash Ratio (number of sessions that crashed relative to total sessions) is an algebraic measure, which can be computed from the crash session count and total session count. Any distributive and algebraic measures can be computed during the grouping process 122.

Holistic measures, such as distinct count, are the measures that are computed based on the whole data set and cannot be computed in a distributive manner. Instead, the inverted index can be used to efficiently calculate distinct count measure. By way of example, user count is the distinct count of user IDs in each session group. For each user ID, the aggregation mechanism 123 can determine that user's sessions with the inverted index, and increment the user count of the corresponding session groups in the hash structure.

Figure 8:
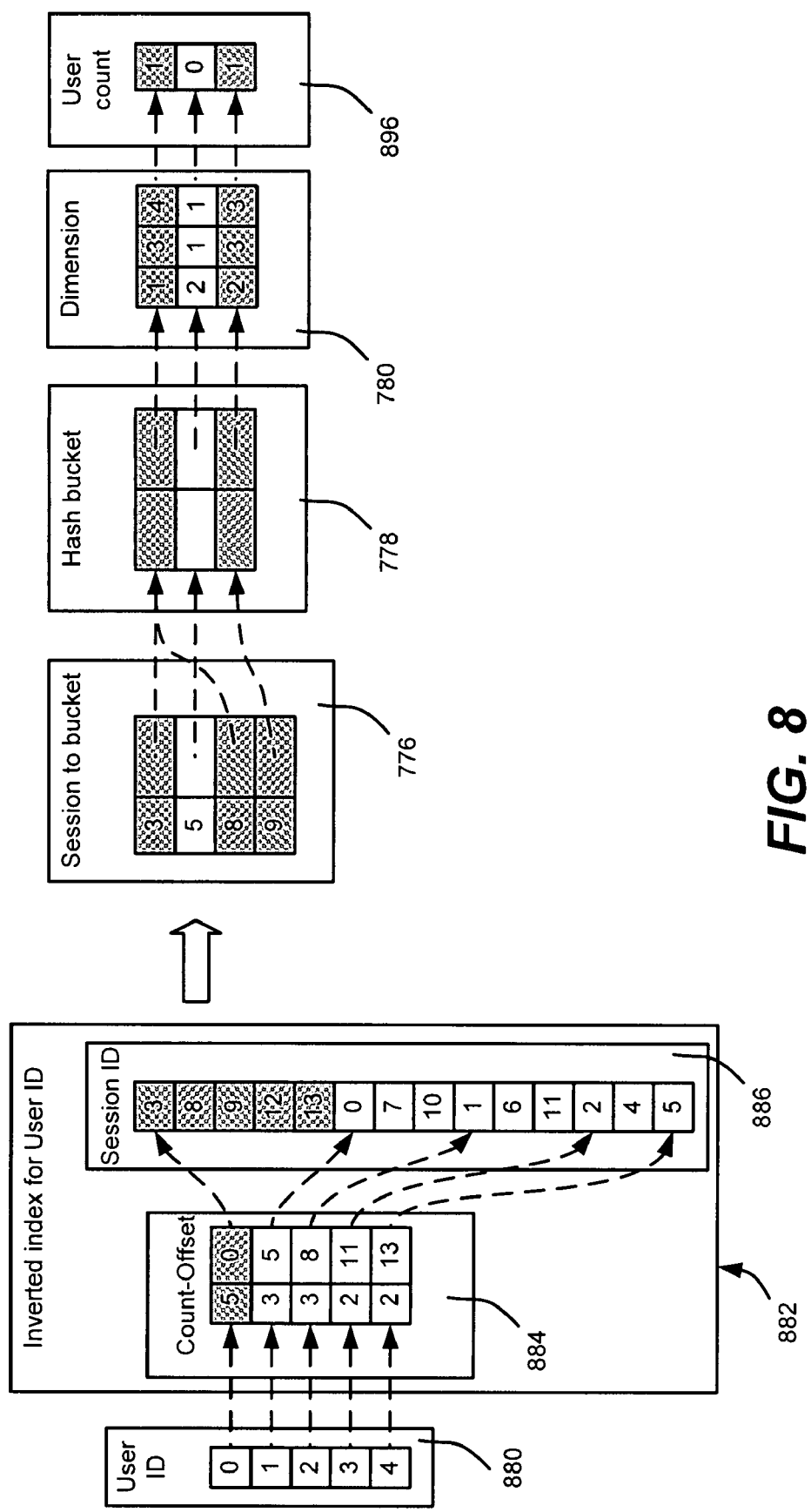
FIG. 8 shows a representation of an aggregating operation example that calculates a distinct count measure.

FIG. 8 shows an example of the calculation of the distinct count measure for a set of user IDs 880 via the inverted index 882 for user IDs. As described above, the inverted index includes a count-offset table 884 which maps the session IDs in the session ID file 886. Using the hash structure (e.g., blocks 776, 778 and 780) described above with reference to FIG. 7, the count (block 896) is incremented for each distinct dimension group. For example, it is seen that user ID 0 includes session identifiers of 3, 8 and 9; session identifiers 3 and 8 have the same dimension values and thus are only counted as one, while session identifier 9 has a different set of dimension values and is thus counted as one (at least while in the state shown in FIG. 8).

With respect to sorting (block 124 of FIG. 1), the query results maybe very large, whereby a typical operator may only want to receive a subset of the result set some lesser number of results, such as the top or bottom k results. After the measure calculation completes, a sorting algorithm (e.g., a heap sort algorithm) may be performed to return a subset of sorted results.

Figure 9:
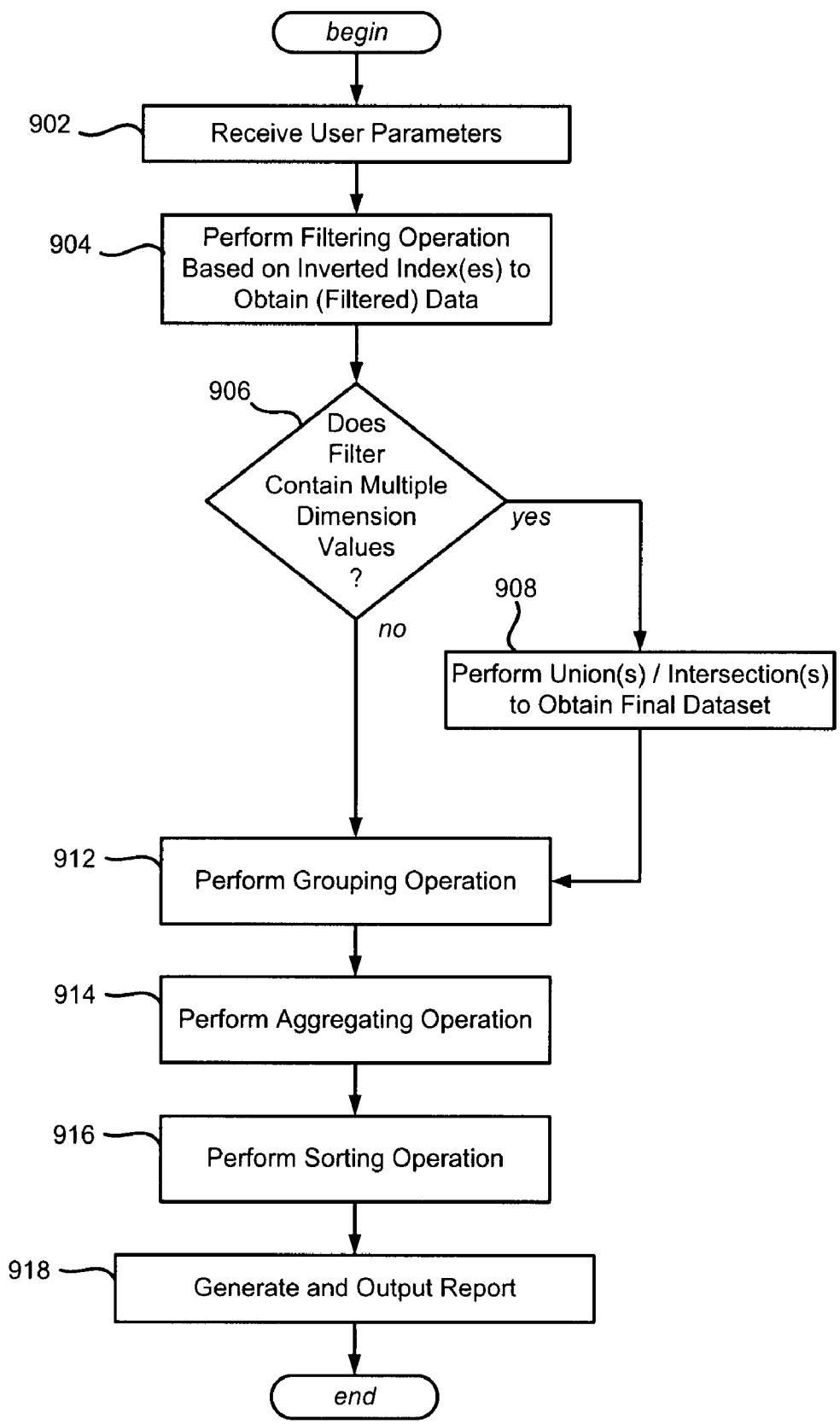
FIG. 9 is a flow diagram representing various example concepts related to analyzing high dimensional data.

To summarize, FIG. 9 is a flow diagram representing example steps in an analysis, beginning at step 902 where the user inputs the analysis parameters. Step 904 represents performing a filtering operation based on inverted index(es) to obtain filtered data.

Step 906 represents evaluating whether the filter contains multiple dimension values. If so, step 908 represents performing the union and/or intersection operation or operations as exemplified above.

Based on the final dataset (e.g., session set for SQM data), grouping, aggregating and sorting are represented via steps 912, 914 and 916, respectively. Note that with respect to aggregation, any distributive and algebraic measures can be computed during the grouping operation (step 912), and to this extent steps 912 and 914 can be considered together. Step 918 represents generating and outputting a report or the like for operator viewing and/or interaction therewith.

As can be readily appreciated, while the technology described herein used examples of how SQM data analysis is supported, it is straightforward to apply the technology to other data sources. For example, web log data is also very high dimensional.

Further, because the data is organized by columns, if there are new variables added for the same data source, only the data of the new variable needs to be imported; there is no need to modify the existing data. In this way, the system provides straightforward extensibility for multidimensional analysis of high dimensional data.

Exemplary Operating Environment

Figure 10:
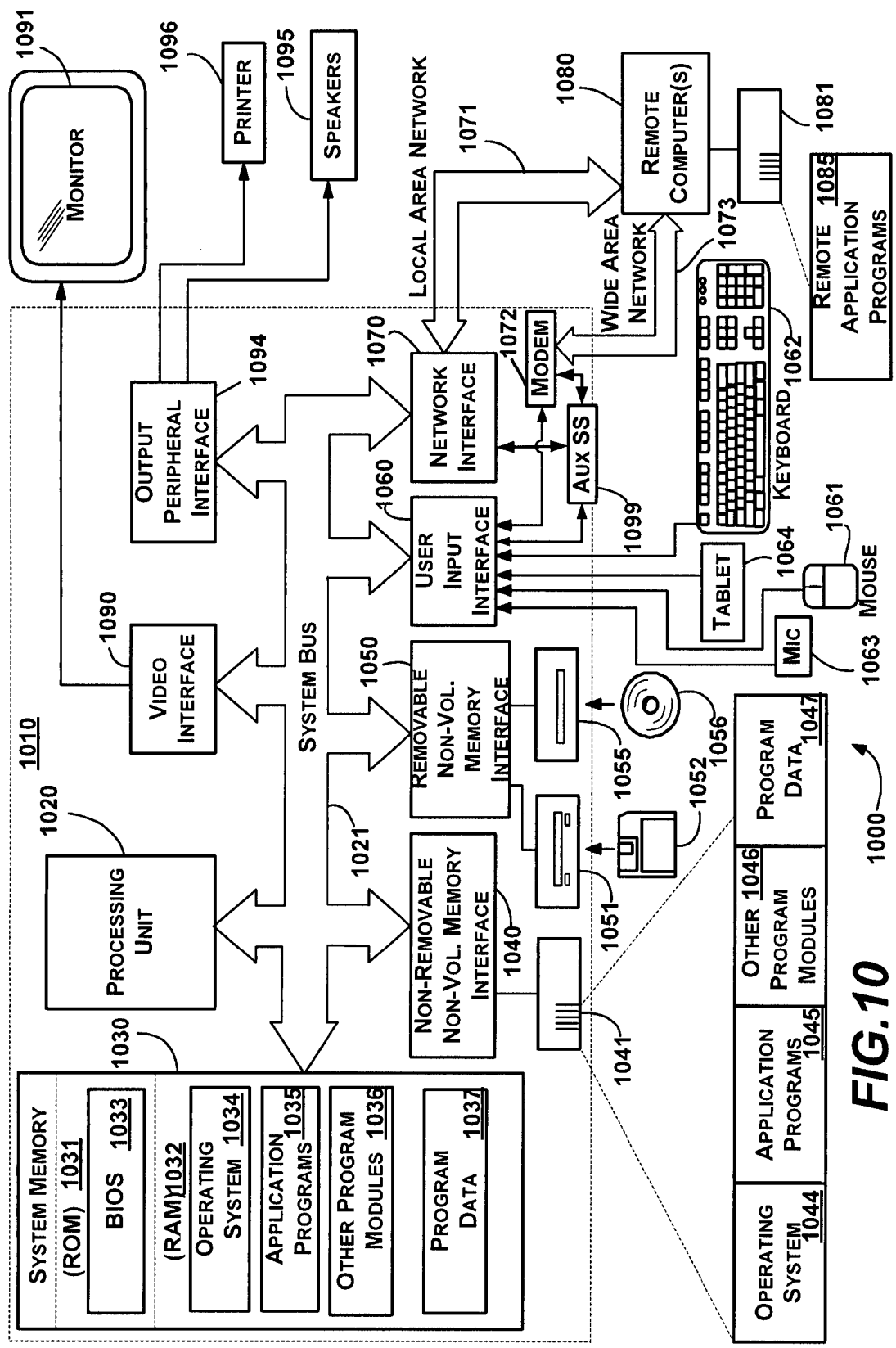
FIG. 10 is an illustrative example of a general-purpose computing environment into which various aspects of the present invention may be incorporated.

FIG. 10 illustrates an example of a suitable computing system environment 1000 on which the analysis tool 102 (FIG. 1) may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 10, an exemplary system for implementing various aspects of the invention may include a general purpose computing device in the form of a computer 1010. Components of the computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer-readable media. Computer-readable media can be any available media that can be accessed by the computer 1010 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1010. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036 and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile-/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media, described above and illustrated in FIG. 10, provide storage of computer-readable instructions, data structures, program modules and other data for the computer 1010. In FIG. 10, for example, hard disk drive 1041 is illustrated as storing operating system 1044, application programs 1045, other program modules 1046 and program data 1047. Note that these components can either be the same as or different from operating system 1034, application programs 1035, other program modules 1036, and program data 1037. Operating system 1044, application programs 1045, other program modules 1046, and program data 1047 are given different numbers herein to illustrate that, at a minimum, they are different copies. A user may enter commands and information into the computer 1010 through input devices such as a tablet, or electronic digitizer, 1064, a microphone 1063, a keyboard 1062 and pointing device 1061, commonly referred to as mouse, trackball or touch pad. Other input devices not shown in FIG. 10 may include a joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. The monitor 1091 may also be integrated with a touch-screen panel or the like. Note that the monitor and/or touch screen panel can be physically coupled to a housing in which the computing device 1010 is incorporated, such as in a tablet-type personal computer. In addition, computers such as the computing device 1010 may also include other peripheral output devices such as speakers 1095 and printer 1096, which may be connected through an output peripheral interface 1094 or the like.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include one or more local area networks (LAN) 1071 and one or more wide area networks (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060 or other appropriate mechanism. A wireless networking component 1074 such as comprising an interface and antenna may be coupled through a suitable device such as an access point or peer computer to a WAN or LAN. In a networked environment, program modules depicted relative to the computer 1010, or portions thereof, may be stored in the remote memory storage device. By way of example, and not limitation, FIG. 10 illustrates remote application programs 1085 as residing on memory device 1081. It may be appreciated that the network connections shown are exemplary and other means of establishing a communications link between the computers may be used.

An auxiliary subsystem 1099 (e.g., for auxiliary display of content) may be connected via the user interface 1060 to allow data such as program content, system status and event notifications to be provided to the user, even if the main portions of the computer system are in a low power state. The auxiliary subsystem 1099 may be connected to the modem 1072 and/or network interface 1070 to allow communication between these systems while the main processing unit 1020 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method performed by one or more computing devices, the method comprising:

accessing a master dataset, the master dataset comprising a plurality of dimensions and a plurality of rows, each dimension comprising a category or type of data, each row comprised of values corresponding to the dimensions, the rows forming columns of values that correspond to the dimensions, the master dataset further comprising a dimension table for a given dimension and an inverted index for the dimension table, the dimension table comprising rows, each row comprising a value or range of values corresponding to the category or type of data of the given dimension, the inverted index identifying, for each row of the dimension table, a corresponding row in the master dataset that contains a value of the dimension that matches the value or range of values of the row of the dimension table;

obtaining a final dataset from the master dataset based on analysis parameters, the analysis parameters including at least one parameter that identifies the given dimension and defines a set of values for the given dimension, wherein the final dataset is comprised of rows of master dataset;

finding the rows of the final dataset by using the inverted index to find rows of the master dataset that have values for the given dimension that match the set of values defined by the analysis parameters;

performing at least one of: a grouping operation, an aggregating operation or a sorting operation, or any combination of a grouping operation, an aggregating operation or a sorting operation to configure a result set from the final dataset; and outputting the result set.

2. The method of claim 1 wherein the analysis parameters define another dimension of the master dataset, and wherein obtaining the final dataset comprises performing a union operation on a set of rows in the other dimension and the rows in the final dataset.

3. The method of claim 1 wherein the analysis parameters define another dimension of the master dataset, and wherein obtaining the final dataset comprises performing an intersection operation on a set of rows in the other dimension and the rows in the final dataset.

4. The method of claim 1 wherein the analysis parameters define two other dimensions, the result dataset is obtained by performing a union operation on rows of the master dataset for the other dimensions to provide a merged set, and performing an intersection operation on the merged set and the final dataset.

5. The method of claim 1 wherein the grouping operation includes building a hash structure in which identifiers having identical dimension value or values correspond to the same group.

6. The method of claim 5 wherein the analysis parameters correspond to a plurality of sets of dimension values, and wherein building the hash structure comprises determining a hash value corresponding to each identifier based on a mathematical computation performed on each of the dimension values associated with that identifier.

7. The method of claim 1 wherein the aggregating operation includes accessing the inverted index and a hash structure to increment a counter for a group of dimension values.

8. The method of claim 1 wherein the sorting operation includes selecting only a top number or a bottom number of results for outputting in the result set.

9. At least one computer-readable storage medium having computer-executable instructions, which when executed by a computer perform steps, the steps comprising:

accessing a master dataset, the master dataset comprising a plurality of dimensions and a plurality of rows, each dimension comprising a dimension value identifying a category or type of data, each row comprised of values corresponding to the dimensions, the rows forming columns of values that correspond to the dimensions;

the master dataset further comprising a dimension table for a given dimension of the master dataset, comprised of rows, each row comprising a definition of a range of values corresponding to the category or type of data of the dimension table's dimension;

an inverted index comprising, for each row of the dimension table, one or more identifiers of rows of the master dataset, wherein each such identified master dataset row has a value for the given dimension that falls within the range of values defined by a corresponding row of the dimension table;

receiving analysis parameters interactively inputted via a user interface;

performing a filtering operation on the master dataset by using the inverted index to find a set of identifiers of rows in the master dataset and a plurality of associated dimension values for each identifier;

grouping the dimension values via a hash operation into grouped dimension values, in which identifiers having identical dimension values correspond to the same dimension group, and using the grouped dimension values to output a result set.

10. The computer-readable storage medium of claim 9 having further computer-executable instructions comprising, building an inverted index for each set of dimension values.

11. The computer-readable storage medium of claim 9 wherein the analysis parameters correspond to two sets of dimension values, and wherein filtering the data comprises performing a union operation on the two sets, or performing an intersection operation on the two sets.

12. The computer-readable storage medium of claim 9 wherein the analysis parameters correspond to a first, second and third set of dimension values, and wherein filtering the data comprises performing a union operation on the first and second sets to provide a merged set, and performing an intersection operation on the merged set and the third set.

13. The computer-readable storage medium of claim 9 wherein the analysis parameters correspond to a plurality of sets of dimensions, and wherein building the hash structure comprises determining a hash value corresponding to each identifier based on a mathematical computation performed on each of the dimension values associated with that identifier.

14. The computer-readable storage medium of claim 9 having further computer-executable instructions comprising, performing an aggregating operation using the grouped dimension values.

15. The computer-readable storage medium of claim 9 having further computer-executable instructions comprising, performing a sorting operation to select only a top number or a bottom number of results for outputting in the result set.

16. At least one computer-readable storage medium having computer-executable instructions, which when executed by a computer perform steps, the steps comprising:

accessing a master dataset, the master dataset comprising a plurality of dimensions and a plurality of rows, each dimension comprising a category or type of data, each row comprised of values corresponding to the dimensions, the rows forming columns of values that correspond to the dimensions, the master dataset further comprising a dimension table for a given dimension and an inverted index for the dimension table, the dimension table comprising rows, each row comprising a value or range of values corresponding to the category or type of data of the given dimension, the inverted index identifying, for each row of the dimension table, a corresponding row in the master dataset that contains a value of the dimension that matches the value or range of values of the row of the dimension table;

obtaining a final dataset from the master dataset based on analysis parameters, the analysis parameters including at least one parameter that identifies the given dimension and defines a set of values for the given dimension, wherein the final dataset is comprised of rows of master dataset;

finding the rows of the final dataset by using the inverted index to find rows of the master dataset that have values for the given dimension that match the set of values defined by the analysis parameters;

performing at least one of: a grouping operation, an aggregating operation or a sorting operation, or any combination of a grouping operation, an aggregating operation or a sorting operation to configure a result set from the final dataset; and outputting the result set.

17. At least one computer-readable storage medium according to claim 16, wherein the steps are performed by a data analysis tool, and the steps performed by the analysis tool further comprise: displaying an interface by which the analysis parameters are inputted by a user, the interface including indicia of the dimensions, and displaying the outputted result set.

* * * * *